(12) United States Patent
Sakai (10) Patent No.: US 7,517,105 B2
(45) Date of Patent: Apr. 14, 2009

(54) SURFACE LIGHT SOURCE AND ELECTRICALLY ILLUMINATED SIGNBOARD

(75) Inventor: Yoshihiro Sakai, 2-27-32, Imakatata, Otsu-shi, Shiga (JP)

(73) Assignees: Asagicreate Co., Ltd., Kyoto (JP); Yoshihiro Sakai, Shiga (JP)

( * ) Notice: Subject to any disclaimer, the term of this patent is extended or adjusted under 35 U.S.C. 154(b) by 173 days.

(21) Appl. No.: 11/649,911

(22) Filed: Jan. 5, 2007

(65) Prior Publication Data

US 2007/0159849 A1    Jul. 12, 2007

(30) Foreign Application Priority Data

Jan. 6, 2006    (JP) .............................. 2006-001638

(51) Int. Cl.
G09F 13/04    (2006.01)

(52) U.S. Cl. .............................. 362/97; 362/29; 362/30; 40/546

(58) Field of Classification Search .................... 362/29, 362/30, 97, 231, 621; 40/546
See application file for complete search history.

(56) References Cited

U.S. PATENT DOCUMENTS

| | | | |
|---|---|---|---|
| 6,964,507 B2 * | 11/2005 | Mohacsi | 362/545 |
| 7,152,988 B2 * | 12/2006 | Hung | 362/97 |
| 7,367,704 B1 * | 5/2008 | Chang | 362/621 |
| 2006/0012989 A1 * | 1/2006 | Lee | 362/231 |
| 2006/0290620 A1 * | 12/2006 | Chou et al. | 345/82 |
| 2008/0047181 A1 * | 2/2008 | Sakai | 40/546 |

FOREIGN PATENT DOCUMENTS

| | | |
|---|---|---|
| JP | 07-320514 | 12/1995 |
| JP | 2003-330394 | 11/2003 |

* cited by examiner

*Primary Examiner*—Sandra O'Shea
*Assistant Examiner*—James W Cranson
(74) *Attorney, Agent, or Firm*—Rabin & Berdo, P.C.

(57) ABSTRACT

LEDs (7) are arranged on at least opposite two corners of a bottom surface of a box body (11) of a tray shape whose bottom surface is quadrilateral, whose upper side is open, on an inner surface of which a light reflection member (11b) is provided, and whose side walls (11c) are inclined outward, so as to irradiate inside of the box body, wherein a plurality of LEDs (71) are arranged so that a region irradiated by each of the LEDs (71) rotates sequentially in a specific direction (same direction). As a result, there can be obtained a surface light source having high brightness and uniformity in an arbitrary size whether the light source is small or large while using semiconductor light emitting devices (LEDs), and an electrically illuminated signboard using the surface light source, which is thin and capable of uniform display and which operates with low electricity consumption.

8 Claims, 9 Drawing Sheets

SURFACE LIGHT SOURCE AND ELECTRICALLY ILLUMINATED SIGNBOARD

FIELD OF THE INVENTION

The present invention relates to a surface light source used as backlights of liquid crystal display devices, illuminations of electrically illuminated signboards, or the like and relates to an electrically illuminated signboard using the same. More particularly, the present invention relates to a surface light source capable of uniforming brightness and chromaticity on its surface, which can be used for backlights of liquid crystal display devices such as television receivers of a thin and large type, or the like, while using semiconductor light emitting devices (LEDs) for light sources, and relates to an electrically illuminated signboard using the same.

BACKGROUND OF THE INVENTION

Figure 11:
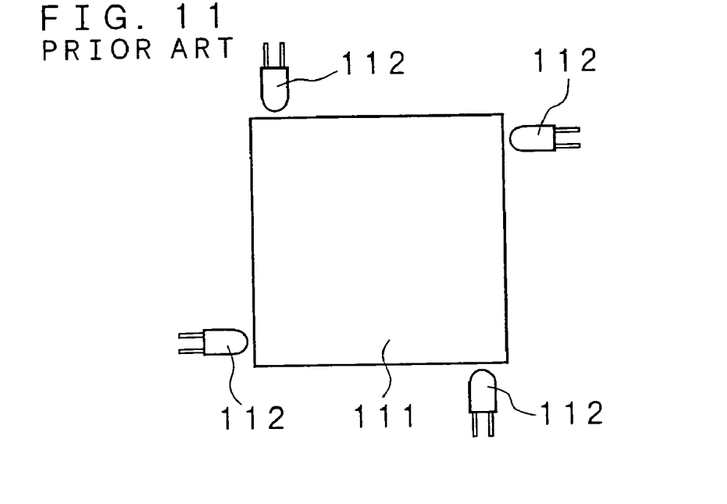
FIG. 11 is a figure explaining an example of a backlight using a light guide plate by the prior art.
Figure 12A:
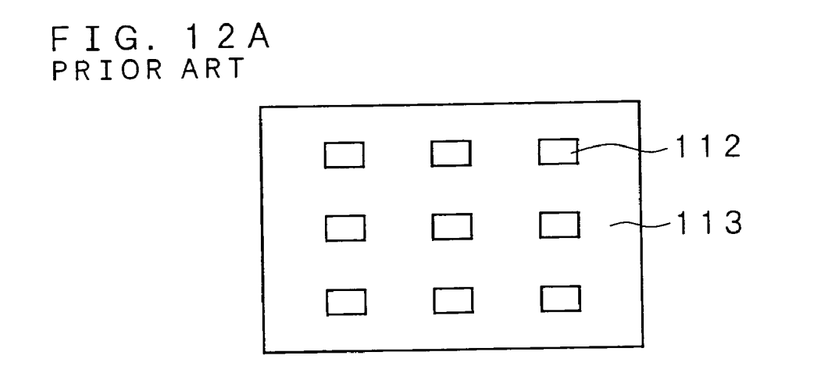
FIGS. 12A and 12B are figures explaining an example of a backlight with conventional LEDs arranged right under.
Figure 12B:
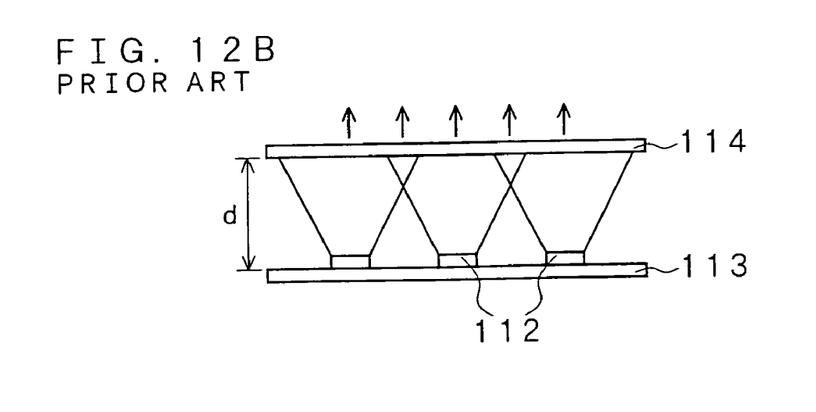

In recent years, liquid crystal display devices are used as display screens, being accompanied with thinning of monitors for television receivers, personal computers or the like, and furthermore the television receivers or the like have a tendency of enlarging. Cold cathode ray tubes are generally used as the backlights for the liquid crystal display devices, but recently, it has been studied to use semiconductor light emitting devices (hereinafter referred to as LEDs) which can be operated with a low drive voltage. In this case, as shown in FIG. 11, a backlight is formed by introducing light of LEDs 112 or the like from sides of a light guide plate 111 and by taking out the light from a surface side of a light reflection surface provided on a back surface of a light reflection plate (cf. for example, Japanese Patent Application Laid-Open No. HEI7-320514), or, is formed, as shown in FIG. 12A and 12B, by arranging the light emitting devices 112 (chips or LED products) provided on the light reflection plate, so that intensity (brightness) of the light in a surface at a position of a light diffusion member 114 is uniformed by spontaneous diffusion of the light, and that the light of uniform brightness is irradiated from the surface of the light diffusion member 114.

In the former case, although brightness in almost entire surface can be uniformed by the light guide plate in a liquid crystal panel of a small type having a side of, for example, approximately 50 mm or less, a light source of a large type can not be obtained without arranging a number of the light guide plates because uniformity in a surface can not be achieved perfectly in the liquid crystal display devices having a screen larger than that described above. Here, as the light should be introduced from a side to the light guide plate 111, a light source of a large type and uniform brightness can not be obtained by arranging light guide plates (ununiformity of brightness in a surface occurs at a part of the LEDs 112), because a part of the light sources (LEDs 112) makes obstruction. Namely, a surface light source of a desired size can not be obtained by arranging (tiling) a number of light guide plates. On the other hand, being accompanied with enlarging television receivers of a thin type, enlarging of backlights for liquid crystal display devices is indispensable.

A constitution in the latter case has been employed for backlights of recent liquid crystal television receivers of a large type or the like, because a surface light source of a desired size can be obtained by arranging LEDs up to a number for making a necessary size. On the contrary, since the light from each of LEDs is irradiated to a liquid crystal panel directly through the light diffusion member 114, a distance d from a bottom surface of the LEDs 112 to the light diffusion member 114 should be approximately 70 mm in order to uniform brightness between adjacent LEDs 112, because if not, brightness at a middle part of the LEDs 112 decreases (even if the light diffusion member is provided, it eliminates directionality of light but has no function of mixing lights which the light guide plate has). Furthermore, there occurs a problem that uniform chromaticity can not be obtained, since chromaticity of each LED varies even among white LEDs and since a distance to the light diffusion member 114 should be larger because lights are not mixed perfectly in case of making white light by mixing colors by using each of LEDs of R, G, and B.

Figure 13:
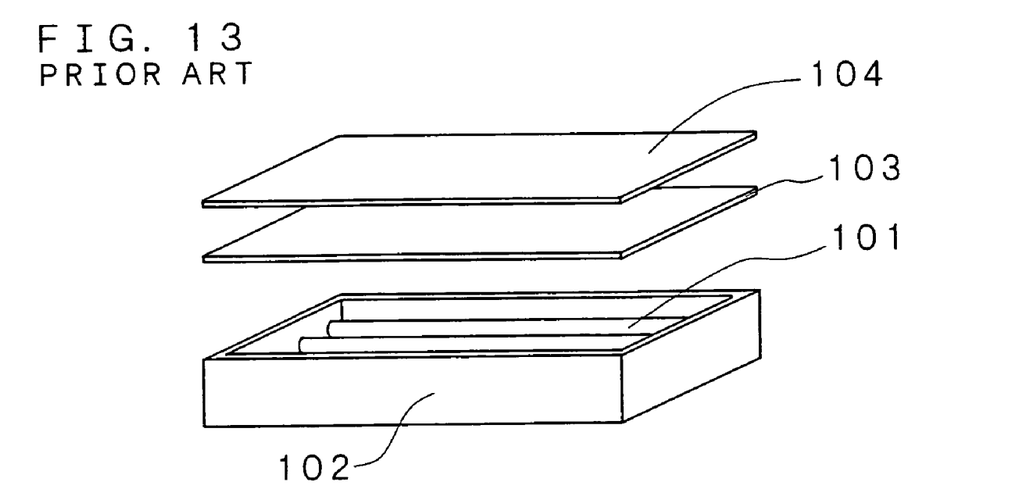
FIG. 13 is a figure explaining an example of a constitution of an electrically illuminated signboard by the prior art.

Electrically illuminated signboards used for advertisement in stations or the like have a structure, as shown for example in FIG. 13, in which several straight fluorescent lamps (hereinafter referred to as fluorescent lamps) 101 or the like are arranged in a light reflection casing (housing) 102 so as to irradiate a display panel 104 or the like through a light diffusion plate 103 or directly. The housing is formed of, for example, stainless steel, aluminum or the like in a shape of a box having an opening at a top surface side, and the fluorescent lamps 101 or the like are provided therein. Then, the housing is formed by coating a light reflection material inside so that the light from the fluorescent lamps irradiates the display panel 104 provided at a front side without being wasted (cf. for example, Japanese Patent Application Laid-Open No. 2003-330394). In case of using LEDs for the light sources, there rise same problems as that in backlights for liquid crystal display devices as described above.

As described above, in the surface light source which irradiates the light from a surface of a light guide plate by introducing the light of LEDs from a side of the light guide plate, as a part of a light source projects, arranging (tiling) a number of them can not be carried out in order to enlarge an area of the surface light source. Here, even if an upper surface of LEDs 112 are covered with a light reflection plate not to expose the light source at a surface, the brightness can not be matched with a part of the light guide plate because the portion is not a region irradiating the light. Uniform irradiation from an entire surface by diffusing the light in the light guide plate is hardly obtained because the light is apt to travel straight even if it is made easy to introduce the light into the light guide plate by using LEDs of a dome type and by narrowing directionality of the light. On the contrary, if the directionality is widened, the light can not be taken into the light guide plate because total reflection increases due to increasing of oblique incident light to the side of the light guide plate. Therefor, the light emitted from the LEDs can not be utilized efficiently, and there exists a problem that the surface light source of high brightness, uniformity and a large type can not be obtained. In LEDs of a chip type not in LEDs of a dome type, a surface light source of high brightness and a large type has not been achieved because of small amount of light flux and its indirect light.

On the other hand, in case of a right-under type in which LED chips or the like are arranged side-by-side directly at a back side of the light diffusion member 114, fine color images can not be displayed since variation of each chromaticity appears because the light of each of the LEDs 112 is irradiated directly without being mixed, and thinning can not be achieved at the same time since the LED chips and the light diffusion plate should be parted by a distance of approximately 70 mm depending on an interval between the LEDs, taking it into consideration to mix colors of R, G, B or the like. Furthermore, when the distance from the light source is large, efficiency of using the light decreases because the brightness decreases in inverse proportion to a square of the distance and, for example, LEDs of a high out put power of approximately 1 W should be arranged through an interval of 35 to 45 mm. Therefor, increasing of input power results in a large long-term change of LEDs by heat generation, necessity of heat dispersion and necessity of a space for setting a heat sink, being against to thinning, but such backlights having the heat sink (50 to 60 mm thick) has been employed in actual television receivers of a large type.

After all, there are problems that in a conventional surface light source using LEDs, a surface light source of a large type can not be obtained simply by using a light guide plate, and that in the right-under type of arranging the LEDs directly under a display plate in matrix structure, thinning the surface light source can not be achieved because a means for dispersing heat becomes necessary as output power of the LEDs is increased to make a distance from a position of the LEDs to a light diffusion member large. Further, in the right-under type, there rises still a problem that a production cost is raised significantly, since LEDs of certain brightness and chromaticity should be used by selecting the LEDs because the lights of each of the LEDs can be hardly mixed.

SUMMARY OF THE INVENTION

The present invention is directed to solve the above-described problems and an object of the present invention is to provide a surface light source of high and uniform brightness, which can be used in liquid crystal television receivers of a thin and large type, and which can be formed in an arbitrary size whether small types or large types, while using semiconductor light emitting devices (LEDs).

Another object of the present invention is to provide an electrically illuminated signboard with low electric power consumption, which is thin and which displays uniformly even in the electrically illuminated signboard displaying a large display panel.

Further, as a result of a repetition of earnest examinations, it has been discovered that, even if a variance of the brightness and the chromaticity exists in the LEDs, a surface light source of very stable brightness and chromaticity can be obtained by leveling the variance, since, by arranging the LEDs so as to irradiate the light from a corner of the bottom surface toward a side wall opposite to the corner, the light is mixed with light emitted from the LEDs arranged on the other corners in the box body of a tray shape by being reflected on the bottom surface and the side wall of the box body. From this point of view, it is preferable to use as many LEDs of low output power as possible, or to arrange on every edge part (corner), and more preferable to arrange two or more LEDs on each of the corners, but here, a shape of the bottom surface of the box body is not limited to a quadrilateral. A shape of a quadrilateral is preferable for forming the surface light source of a large type because of easy tiling, but the lights can be mixed in same manner in a shape of a triangle. Although the LEDs are preferably arranged on the corners because a shadow part of the light irradiated (part not irradiated directly) occurs in the box body, the LEDs can be arranged on a part of not corners by irradiating the shadow part by other LEDs. As a direction of the LEDs, an inclined angle and a height of the side walls, or the like can be adjusted for uniforming the brightness in the box body, mass production becomes capable by setting conditions (height, width, angle or the like) for getting uniform brightness by adjusting the directionality of the LEDs and direction of arrangement, and height of the side wall in a step of making prototypes, and by designing with the conditions.

A surface light source unit according to the present invention includes a box body of a tray shape, whose bottom surface is a polygon having three or more corners, whose upper side is open, on an inner surface of which a light reflection member is provided, and whose side walls are inclined outward, and semiconductor light emitting devices which are provided on at least two corners of edge parts of the bottom surface of the box body so as to irradiate light toward side walls of the box body, wherein light of the semiconductor lights emitting devices provided on at least two corners are mixed mutually in the box body by being reflected diffusedly on the bottom surface and the side walls of the box body, and wherein light of the semiconductor light emitting devices provided on at least two corners is irradiated from the opened upper surface of the box body, the light being averaged in brightness, chromaticity and luminescent hue. Here, any type of a dome type or a chip type can be employed as the semiconductor light emitting devices. In addition, white LEDs or LEDs of each color of R, G, and B to be mixed may be used.

Other embodiment of the surface light source unit according to the present invention includes a box body of a tray shape, whose bottom surface is a polygon having three or more corners, whose upper side is open, on an inner surface of which a light reflection member is provided, and whose side walls are inclined outward, and semiconductor light emitting devices provided on at least two corners of edge parts of the bottom surface of the box body so as to irradiate light toward side walls of the box body, wherein the semiconductor light emitting devices provided on at least two corners are arranged so as to mix emitted lights mutually in the box body by being reflected on the bottom surface and the side walls of the box body, and wherein an inclined angle and a height of the side walls of the box body are set so as to make brightness on the opened upper surface of a side wall side and of a center part side of the box body substantially equal.

Here, the substantially equal brightness means such brightness that uneven brightness is not noticeable in case of setting a display panel or the like, or that difference is, for example, approximately 30% or less in a variance of the brightness.

The surface light source unit may be formed in a structure in which: the bottom surface of the box body is formed in a quadrilateral shape; each of the light emitting devices is a chip type light emitting device; the semiconductor light emitting devices are provided on at least opposite two corners of the bottom surface of the box body so as to irradiate inside of the box body; and the semiconductor light emitting devices are arranged in positions of rotational symmetry as to a center of the box body and regions irradiated by each of the light emitting devices moves in a manner of the rotational symmetry.

Here, the semiconductor light emitting device of a chip type means not a type of mounting a light emitting semiconductor chip in a curved recess, but all semiconductor light emitting devices formed by mounting the light emitting semiconductor chip on a flat portion of a lead or a substrate and by coating surrounding of the light emitting semiconductor chip with resin, including one provided with a lens portion at a resin portion of an outer part, one provided with a light reflection wall, or the like.

The light emitting device may have at least one of structures in which: a light emitting semiconductor chip is mounted on a flat surface of one of a pair of leads and coated with light transmitting resin so as to have a lens portion at a front side; a light emitting semiconductor chip is mounted on a flat surface of one of a pair of leads and coated with light transmitting resin so as to have a flat surface at a front side; a structure of a side-view type is formed in which, by exposing an end part of each of a pair of leads in a recess, by fixing the other end part with resin so as to be located on an outer wall, and by mounting a light emitting chip in the recess, light is irradiated in a direction perpendicular to a surface on which end parts of the pair of the leads are connected; a light emitting chip is mounted on an insulating substrate, and a pair of terminal electrodes or leads are arranged on opposite end portions of the insulating substrate, and surrounding of the light emitting chip is coated with light transmitting resin; and a structure of a reflection type is formed in which a reflection wall is formed around a light transmitting resin which coats a light emitting chip provided on an insulating substrate.

Two light emitting devices may be arranged on each corner of at least the two corners, and wherein a set of the two light emitting devices are arranged so that each region mainly irradiated by the two light emitting devices is a different half space as to a diagonal line passing the corner where the two light emitting devices are provided.

A surface light source according to the present invention includes: a plurality of surface light source units provided side-by-side without gaps, each of the surface light source units comprising: a box body of a tray shape, whose bottom surface is a polygon having three or more corners, whose upper side is open, on an inner surface of which a light reflection member is provided, and whose side walls are inclined outward; and semiconductor light emitting devices which are provided on at least two corners of ridge parts of the bottom surface of the box body so as to irradiate light toward side walls of the box body; wherein lights of the semiconductor light emitting devices provided on at least two corners are mixed mutually in the box body by being reflected on the bottom surface and the side walls of the box body; and wherein each of the surface light source units is formed so that brightness above center portion part of each of the surface light source units and brightness above adjoining portion of the surface light source units are substantially equal in a surface at least 25 mm above from an upper surface of the surface light source units arranged.

The surface light source can be used as a surface light source as it is or compose a display device by providing at least one of a light diffusion member, a condenser prism and a display panel at a position 5 to 30 mm high from the upper surface of the surface light source unit.

The surface light source can display with good appearance and excellent color rendering property when used in liquid crystal display devices of a thin type by setting an inclined angle and a height of the side walls of the box body so that lights of the semiconductor light emitting devices provided on at least two corners are mixed mutually in the box body by being reflected diffusedly on the bottom surface and the side walls of the box body, and that the light of the semiconductor light emitting devices provided on at least two corners is averaged in brightness, chromaticity and luminescent hue.

The surface light source can irradiate the light having almost uniform brightness on the entire surface without making any gaps between the surface light source units by wiring or the like, by drawing out leads to be connected to electrodes of each of the light emitting devices in a space portion formed outside of the box body at a bottom between adjacent box bodies, and by connecting the leads to a power source.

The surface light source is formed by arranging the surface light source units so as to prevent adjacent two side walls of adjacent surface light source units from being exposed in the same height at a surface, by forming a side wall of one surface light source unit lower than the other at a portion of adjoining each other. By this structure, a uniform and large surface light source which has unnoticeable adjoining portions can be obtained even if a large surface light source is formed by arranging the plurality of surface light source units.

The electrically illuminated signboard according to the present invention includes: a surface light source formed with one or more surface light source units, a light diffusion plate provided through a certain distance over the surface light source and a display panel provided on the light diffusion plate, wherein each of the one or more surface light source units including; a box body of a tray shape, whose bottom surface is quadrilateral, whose upper side is open, on an inner surface of which of which a light diffused-reflection member is provided, and whose side walls are inclined outward, and semiconductor light emitting devices of a chip type which are provided on at least opposite two corners of the bottom surface of the box body so as to irradiate inside of the box body.

By the present invention, since a light diffused-reflection member reflecting light diffusedly is provided on an inner surface of the box body, and since semiconductor light emitting devices are provided in the bottom surface so as to irradiate the light toward side walls, almost a half of an amount of the light spread by the directionality of the light emitting devices is reflected diffusedly by the bottom surface, and the light traveling straight is reflected by the side walls. Then, lights from each of the light emitting devices are mixed mutually in the box body, because the light from each of the light emitting devices arranged on the corners of the bottom surface of the box body is reflected diffusedly in a same manner. Therefor, if some variance of the brightness and the chromaticity of the semiconductor light emitting devices exists, the chromaticity of each of the LEDs does not appear partially like in the right-under type, by leveling the variance. As a size of the box body can be set arbitrarily in a range from 30 to 130 mm, in case of adjusting brightness of light sources partially (each area), for example, in liquid crystal television receivers, the brightness of every box body can be adjusted, a remarkably finer adjustment can be carried out than an adjustment in elongated cold cathode ray tubes by the prior art and quality of displayed images can be raised as a result.

Since the box body is formed in a structure in which the side walls incline and spread outward, spaces are formed at a bottom surface side between adjacent box bodies in tiling a number of box bodies while the box bodies are arranged without any gap at a surface side from which the light is irradiated. And since the light emitting devices are provided on the corners of the bottom surface of the box bodies, a power source can be connected to leads to drive the light emitting device by laying leads outside of the bottom surface of the box bodies or can be connected directly to wiring of a circuit board on which the bottom surface of the box body is fixed. Then, as the power source can be connected easily to each of the light emitting devices while the brightness is uniform without any gap at the surface side, even if any number of body boxes are arranged, even a light source for a large screen can irradiate light simply and with uniform brightness. If, it is preferable that the box body is quadrilateral in case of a quadrilateral screen such as those of liquid crystal television receivers or electrically illuminated signboards, because tiling is carried out without waste and simply, but tiling can be carried out in other polygons in a same manner.

For example, by a structure in which: semiconductor light emitting devices (LED) of a chip type are provided on at least opposite two corners of the bottom surface of the box body of a tray shape (a shape of a cross-section is trapezoidal) on an inner surface of which a light reflection member is provided; the LEDs are arranged so as to irradiate inside of the box body; and the direction of irradiating light by each of the LEDs rotates subsequently by providing the LEDs in places and direction of rotational symmetry on at least two corners, the lights irradiated from the LEDs are irradiated in the entire box body uniformly and are mixed mutually. Since a semiconductor light emitting device of a chip type provided with a lens or a reflection wall can be formed so as to have directionality of 45 to 60 degrees as LEDs of a dome type have, a half region divided by a diagonal line of the bottom surface passing the corner, on which the light emitting device is provided, can be covered by one light emitting device. Even in case of the light emitting device having no lens nor reflection wall, although the directionality spreads, as intensity of the light at a center is strong and as the light spread in a peripheral part is reflected by a light diffusion member provided at an opening side of a tray and side walls of the tray, fundamentally, the light irradiates mainly a half region of the box body divided by the diagonal line and irradiates from the light diffusion member as light of uniform brightness by being leveled in the box body. Even if the light diffusion member is not provided at the opening side, especially in case of using for liquid crystal display devices or electrically illuminated signboards, as a display panel is provided above the opening portion, almost all light irradiated outside, even light traveling obliquely, utilized effectively. An irradiation direction of each of the LEDs, arrangement of the LEDs or the like is not limited to the examples. By forming a surface light source by adjusting an irradiation direction of light emitting device, directionality, an inclined angle and a height of side walls, or the like so as to make the brightness at the surface side constant, mass production becomes capable by using the dimensions after that.

As a result, even in liquid crystal television receivers of a large type, a light source can be obtained in which: a thin backlight with uniform brightness can be realized; the brightness can be controlled for each of surface light source units; the brightness or the like of backlight can be controlled for each of areas; and not only improvement of color rendering property but also display of images with more excellent quality than that of the cold cathode ray tube can be achieved. In addition, even in electrically illuminated signboards, a signboard with low electricity consumption, long life time and maintenance free, by using semiconductor light emitting devices can be obtained.

In case of fabricating the surface light source of a desired size by arranging the plurality of surface light source units, each unit being composed of one box body, as a width of an area from which no light is irradiated can be prevented from increasing by two thickness of adjacent side walls of the box bodies by forming a side wall of one surface light source unit lower than the other at a place of adjoining each other, the surface light source of a large type and high uniformity can be obtained in which a adjoining portion is unnoticeable even if the surface light source of the large type is formed by arranging the plurality of surface light source units side-by-side. Further, the adjoining portion is made more unnoticeable by sticking a light reflection sheet on an inner surface of the lower side wall of the one surface light source unit so as to overhang from a top end surface of the other side wall, thereby to cover the top end surface of the other side wall. When a thickness of the box body formed by sticking the light reflection member and the metal plate is thinned to a thickness of 0.2 mm, the adjoining portion can be made noticeable only by a level difference, without using the light reflection sheet.

DETAILED DESCRIPTION

An explanation will be given below of a surface light source according to the present invention and an electrically illuminated signboard using the same in reference to the drawings. As there are shown in FIGS. 1A to 1D, figures explaining a plan view and a side view of an embodiment of the surface light source unit according to the present invention, a cross-sectional view of the box body and a side view of a light emitting device, the surface light source unit according to the present invention is provided with LEDs 7 of a chip type provided on at least opposite two corners of the bottom surface of the box body 11 of a tray shape so as to irradiate inside of the box body, whose bottom surface is quadrilateral, whose upper side is open, on an inner surface of which a light diffused-reflection member 11b is provided, and whose side walls 11c are inclined outward. Here, a plurality of LEDs 7 (71) are arranged so that a region irradiated by each of the LEDs 7 (71) rotates in a certain direction (same direction) subsequently. In an example shown in FIG. 1A, one of the LEDs 7 is arranged on each of four corners of the bottom surface of the box body 11. In this case, each of the LEDs 7 is preferably arranged so that a middle point of an upper surface of an opposite side wall 11c becomes a center of irradiation. Although, this is for using the light spread toward the bottom surface effectively because the LEDs 7 of a chip type generally has wide directionality, the LEDs 7 of a chip type having narrow directionality provided with a lens portion or a reflection wall may be arranged so that a center of irradiation lies at a bottom surface side of the box body 11. As a result, each of the regions irradiated by the LEDs 7 (7a to 7d) arranged on the four corners rotates subsequently in the certain direction (same direction) in the box body 11.

Figure 1A:
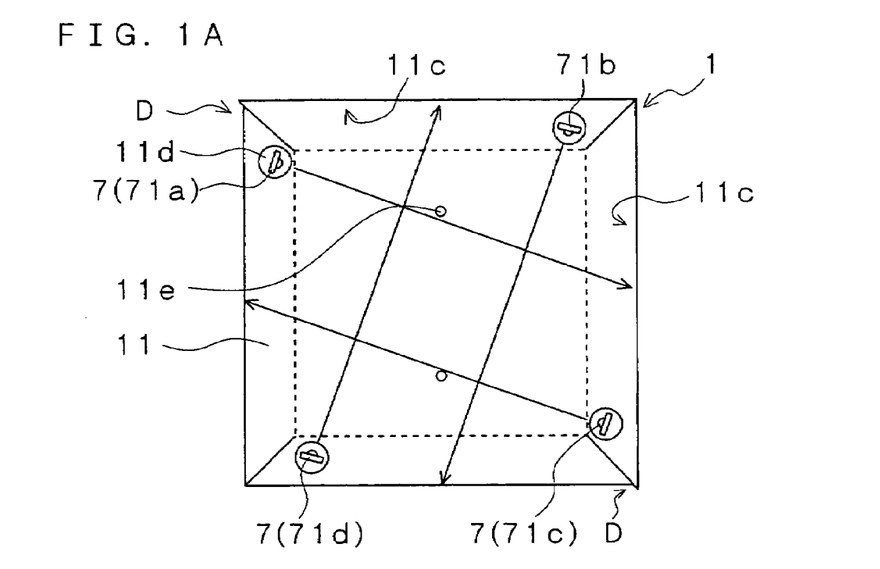
FIGS. 1A to 1D are figures explaining a plan view and a side view of an embodiment of the surface light source unit according to the present invention, a cross-sectional view of the box body and a fixing part of a LED.
Figure 1B:
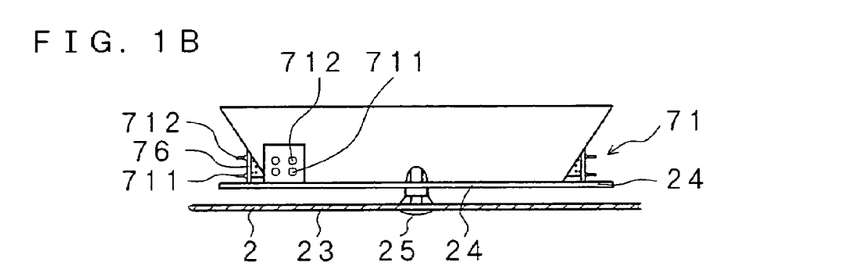
Figure 1C:
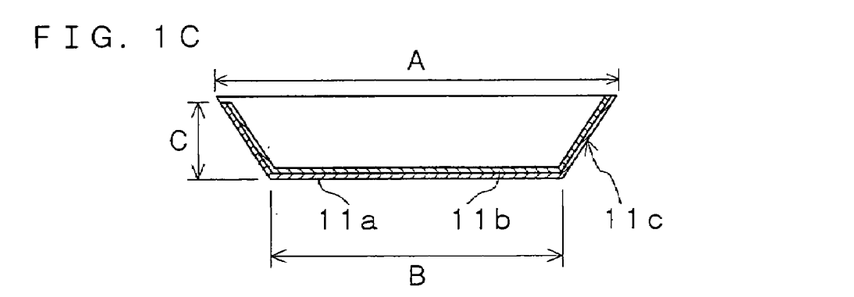
Figure 1D:
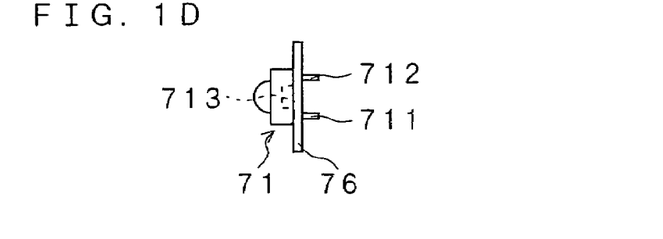

As shown in FIG. 1D, the LED 71 of a chip type is fixed by inserting and fixing leads 711 and 712 of the LED 71 to a mounting plate 76, and by fixing the mounting plate 76 to a wiring board 24. As a result, fixing the mounting plate 76 on which the LED 71 is fixed to the wiring board 24, and the LEDs 7 (71) can be arranged on the corners of the bottom surface of the box body 11 only by covering the box body 11 provided with holes 11*d* on corners of the bottom surface.

Figure 2A:
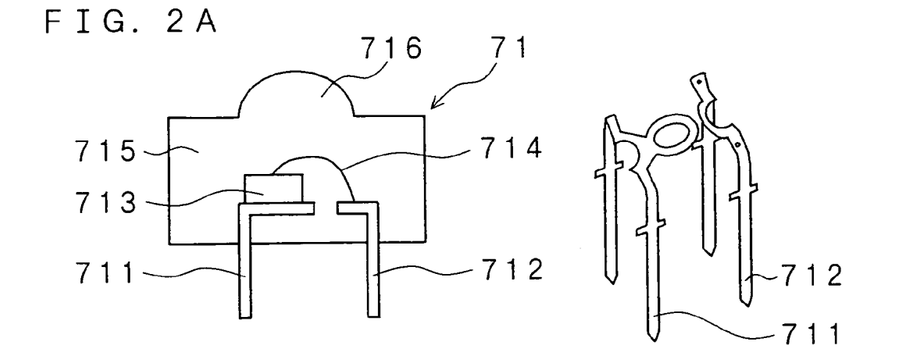
FIGS. 2A to 2E are figures explaining examples of the structure of semiconductor light emitting devices of a chip type according to the present invention.

The LED 71 shown in FIG. 1A to 1D is formed, as a cross-sectional view and an oblique view explaining a lead portion in FIG. 2A, in a structure of; bending two leads 711 and 712 formed of a lead frame or the like in a U shape, mounting a LED chip 713 on a flat portion of one side thereof, connecting a pair of electrodes to the two leads 711 and 712 with a wire 714 or the like, and coating its surrounding with light transmitting resin 715. In this example, a convex lens portion 716 is formed on a light irradiation surface of the light transmitting resin 715. Although the light spreads horizontally in the LED of chip type, an extent of the light can be narrowed down to a range of approximately 45 to 60 degrees by forming such lens portion 716, because the light can be condensed to some extent. The LED 7 (including those in examples of FIG. 2B to 2E, or the like) is formed so as to irradiate white light, for example, by coating a surrounding of the LED chip 713 emitting blue light with resin mixed with color conversion member of light.

Figure 2B:
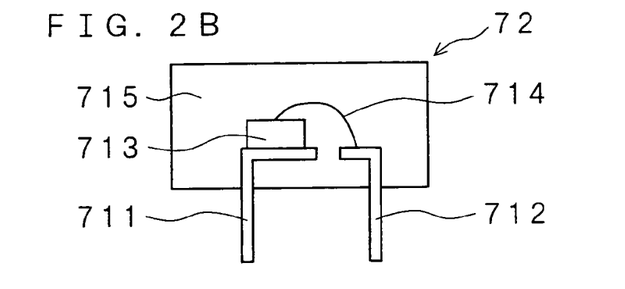

In the LED 7 although a type having the lens portion is preferable because the light is easily condensed and because the light is utilized effectively, a type of not having the lens portion, for example, as shown in FIG. 2B, may be used, since the light is irradiated into the box body 11 on an inner surface of which a light reflection member 11*b* of high reflection property, and since, a light diffusion member 13 and/or a light diffusion plate, a display panel or the like described later are provided at the surface side. Here, as a structure of the LED 72 of this type is same as that shown in FIG. 2A except having no lens portion, an explanation is omitted by attaching same numerals and letters to same parts.

Figure 2C:
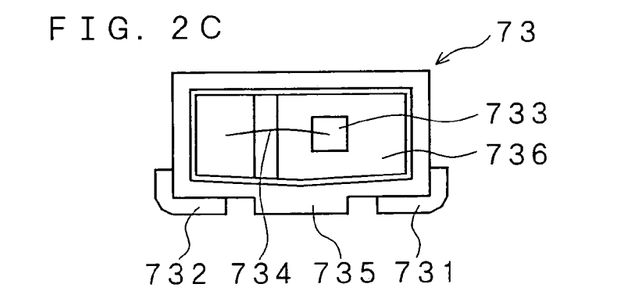

In the LED 7, a LED 73 of a side view type, whose top view is shown in FIG. 2C, may be used. Namely, in FIG. 2C, the LED 73 of a side view type irradiating light in direction parallel to a wiring board or the like is formed in a structure of; adhering a pair of leads 731 and 732 formed with a lead frame or the like with light non-transmitting resin 735 or the like so that an end part of each of the leads is exposed in a recess and that the other end part is drawn outside, bonding a LED chip 733 on the end part of the pair of leads exposed in the recess and connecting with a wire 734, fixing a surrounding thereof with light transmitting resin 736, and connecting and fixing the pair of leads 731 and 732 exposed outside to the wiring board or the like directly by soldering.

Figure 2D:
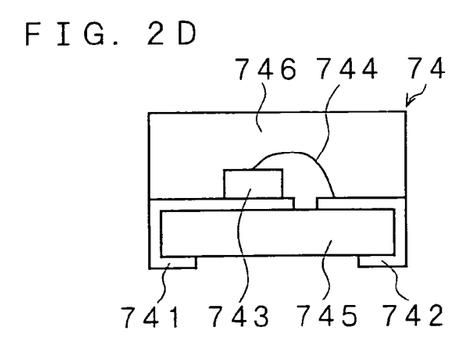
Figure 2E:
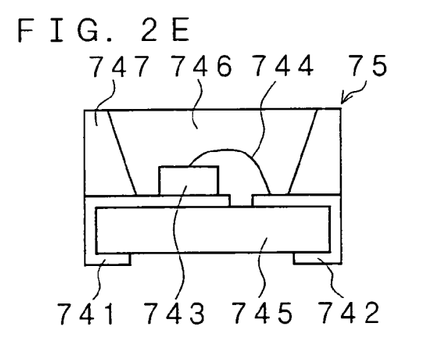

Further, a structure shown in FIG. 2D may be used in the LED 7. Namely, in FIG. 2D, the LED 7 is formed by forming a pair of terminal electrodes 741 and 742 on both end parts of an insulating substrate 745 providing a LED chip 743 so as to be connected electrically to the pair of the terminal electrodes 741 and 742 with the wire 744, an electroconductive adhesive or the like, and coating surrounding of the LED 7 with the light transmitting resin. In addition, a beam of the light irradiating can be narrowed down by using a LED 75 of a reflection type formed by providing a reflection wall 747 around the light transmitting resin 745 as shown in FIG. 2E. In FIG. 2E, same numerals and letters are attached to same parts in FIG. 2D and explanations are omitted.

For example, as shown in FIG. 1C, the box body is formed by sticking a diffused-reflection member 11*b* such as, for example, the product E60 (foamed sheet of polyester of approximately 180 μm thick) by Toray Co., Ltd on one surface of an aluminum plate 11*a* approximately 0.35 mm thick, by punching it in a shape shown in FIG. 2B described later, and by bending parts of an end surface side into a tray shape. A height of the side wall 11*c* to be bent and a bending angle is decided so that light is reflected efficiently and irradiated from the opening surface side effectively. For example, in case that a side A of an outer circumference is 80 mm (square shape, same hereinafter), a side B of the bottom surface is approximately 54.4 mm and a height C is approximately 14.2 mm and in case that a side A of an outer circumference is 100 mm, a side B of the bottom surface is approximately 74.4 mm and a height C is approximately 19.2 mm. As the diffused-reflection member 11*b* is a foamed sheet having irregularity on its surface, it becomes a random reflection surface reflecting light in all direction. Namely, although depending on a size of the bottom surface of the box body 11, the brightness on a surface of the box body 11 can be made almost uniform (substantially), as a height C of the box body 11 is settled in a range from 10 to 20 mm. As the reflection member 11*b*, the product MCPET (ultra fine foamed light reflection sheet) of approximately 1 to 2 mm thick by Furukawa Electric Co., Ltd, or the like can be employed.

As for the side walls 11*c* of the box body 11, when the surface light source unit is used alone, the four walls 11*c* may have a same height, but when a large surface light source is fabricated by arranging the plurality of surface light source units, heights of two walls are preferably lower than those of others to prevent two top end surfaces of the side walls from adjoining each other at a adjoining portion. In FIG. 1A, as the heights of the side walls 11*c* of an upper side and a right side are formed lower, level differences are formed at parts represented by D. In addition, in order to the adjoining portion more unnoticeable, by sticking a light reflection sheet such as the light diffused-reflection member 11*b* on an inside surface of one of side walls highly, a dead space of the adjoining portion observed from front side becomes approximately 0.18 mm of a thickness of the sheet, and the adjoining portion becomes more unnoticeable. These details will be explained in FIG. 10B. On the other hand, as a material formed by sticking an aluminum plate and a light diffused-reflection member has been thinned, only a side surface approximately 0.2 mm thick, which is a level difference described above, is exposed at a surface when it is formed in a thickness of approximately 0.2 mm, and the adjoining portion can be unnoticeable without using the light reflection sheet.

Through holes 11*d* in which LEDs 7 described later are inserted are formed at corners of the side walls 11*c* of the box body 11 so that a side of an light emission surface of the LEDs 7 peeps inside the box body 11, and that lead parts are connected to wiring boards 24 or the like outside of the box body 11 (In FIG. 1B, connection of the leads 711 and 712, and the wiring board 24 is omitted).

Powder of titanium oxide or the like is coated on a surface of the light diffused-reflection member 11*b* of the box body 11, and as the powder irradiated by ultraviolet rays emitted from LEDs or the like has a function of a catalyst to dissolve organic contaminants on the surface of the light diffused-reflection member 11*b* and to make stain unnoticeable without deteriorating light reflection coefficient, contamination by dust or the like can be inhibited. As a result, in addition to using semiconductor light emitting devices of a very long life time as light sources, maintenance free during a long period can be achieved without deteriorating brightness.

By the present invention, in order to diffuse light irradiated from the LEDs 71 in the box body 11 (diffusion in the box body 11 is referred as a primary diffusion region) usefully and uniformly, and to irradiate the light almost uniformly at a center portion part of the opening surface and at a side wall side of the opening surface, the LED 71a arranged on one corner of the bottom surface, is arranged, so as to face a center part of an opposing side walls 11c as shown by arrow signs from the LEDs 71a, 71b, 71c and 71d shown in FIG. 1A, and so as that a center part of the directionality faces an upper part of the side wall in case of having a wide directionality. The LEDs 71a, 71b, 71c and 71d arranged on each corner are arranged in a same direction just as rotated as to a center of the box body 11. Therefor, the LEDs 71 are arranged not toward a center of the box body 11 but toward a center of one side wall 11c.

Here, the leads 711 and 712 are outside of the box body 11 and only coated parts with resin are in the box body 11. As the directionality of the LEDs 71 is a stereo type, the light spreads not only in a direction parallel to a paper of the figure but also in a direction perpendicular to the paper, the light spread to the bottom surface side of the box body 11 is reflected at the bottom surface of the box body 11, and most part of light spread opposite to the bottom surface is irradiated upward as it is.

As a result, in an arrangement of the LEDs 7 described above, the LEDs 71 are arranged so that the one LED 71a takes charge of irradiating mainly a half region of the space of the box body 11 though irradiating entire space of the box body 11 in case of the light irradiated widely, that the adjacent LED 71b takes charge of irradiating a half region between a diagonal line rotated 90 degrees and the adjacent side wall 11c, and that the LED 71c and 71d take charge of irradiating a half region rotated successively. Then, lights of at least two LEDs are mixed perfectly and as lights of four LEDs can be mixed by widening an extent of irradiated light, uniformity can be obtained in an entire surface by uniformed light, and uniform light from the front side is irradiated as from a surface light source.

Figure 3A:
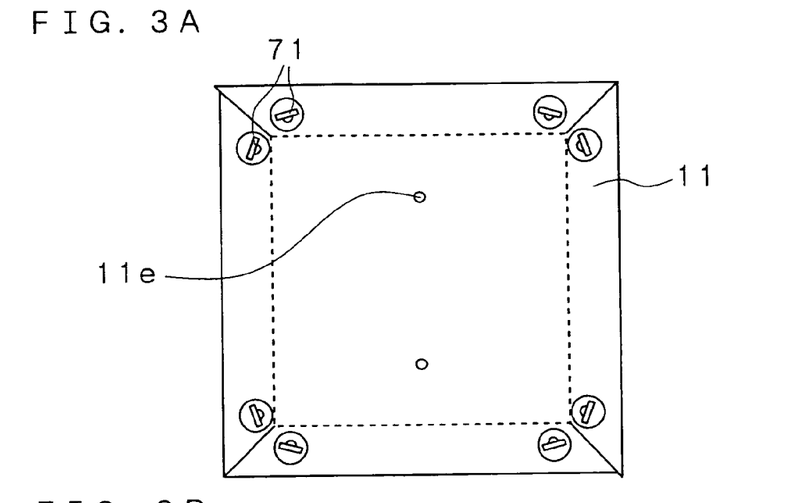
FIGS. 3A to 3D are figures showing other examples of the surface light source unit according to the present invention.
Figure 3B:
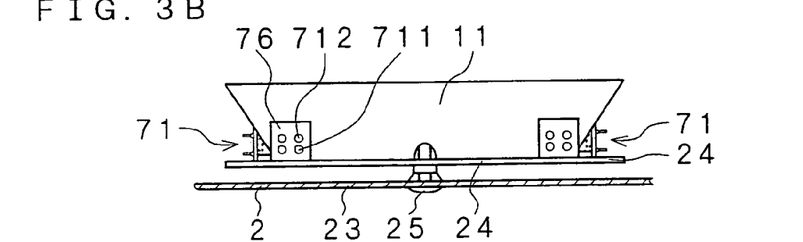
Figure 3C:
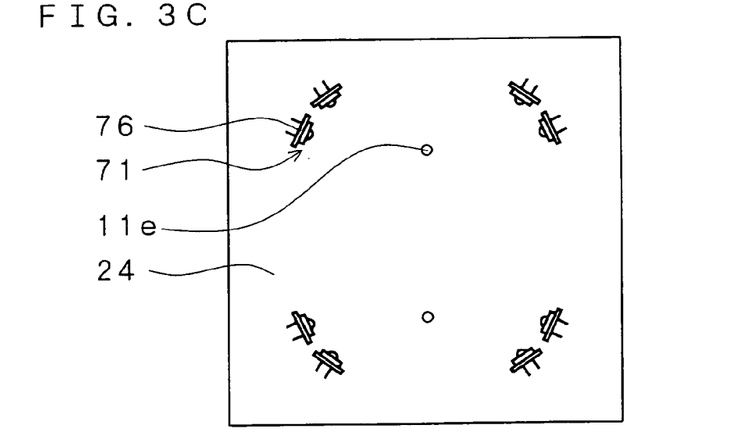
Figure 3D:
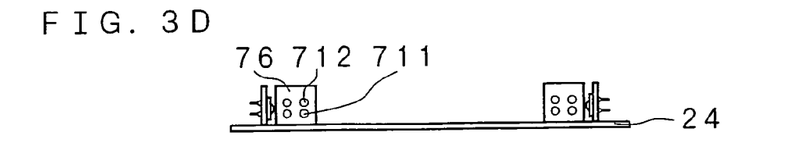

Although, in the example shown in FIG. 1, each one of the LEDs 71 is arranged on each corner of the four corners of the box body 11, it is preferable to arrange each two of the LEDs 71 on each corner of the four corners, because the brightness can be enhanced further and because uniformity is easily obtained even if variance of the color or the brightness exists among the LEDs, 71. The example is shown in FIG. 3. And, FIGS. 3A and 3B are same kind as FIGS. 1A and 1B, FIG. 3C shows the LEDs 71 arranged on a wiring board before mounting the box body 11, and FIG. 3D shows a side view thereof, respectively.

Figure 4:
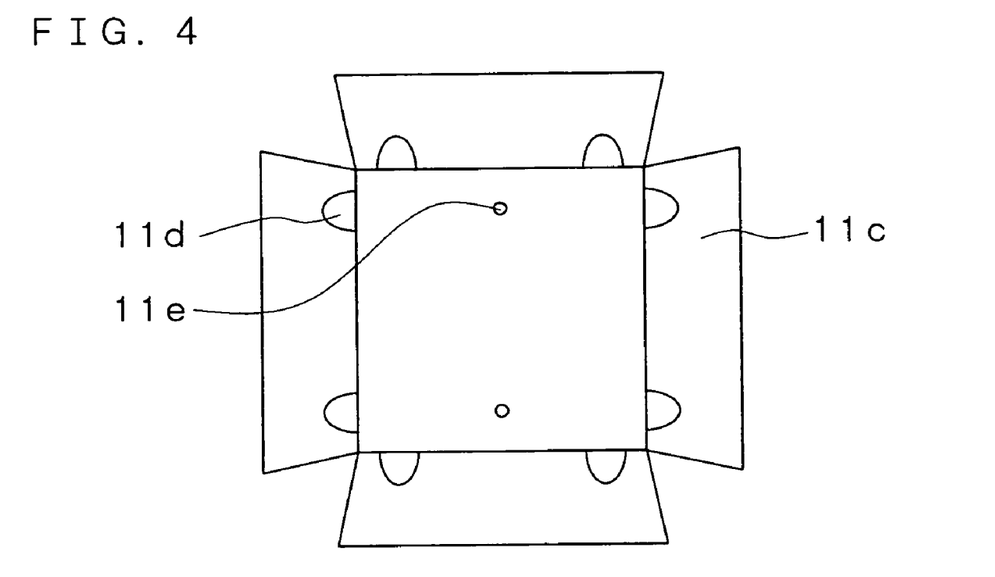
FIG. 4 is a figure explaining a plan view showing a developed view of a box body shown in FIG. 1 before assembling.

In order to make the box body 11, by punching, for example, a plate formed by sticking the above-described aluminum plate and the diffused-reflection member so as to provide through holes 11d for inserting the LEDs 71 and side walls 11c as shown in FIG. 4, the side walls having a desired inclined angle can be obtained with bending the side walls 11c and fixing. Here, 11e represents rivet holes to be inserted by resin rivets 25 used in fixing the box body 11 to the fixing metal fitting 23 as shown in FIG. 1B and positions of the through holes are dislocated not to fix in a wrong direction as described later.

Figure 5:
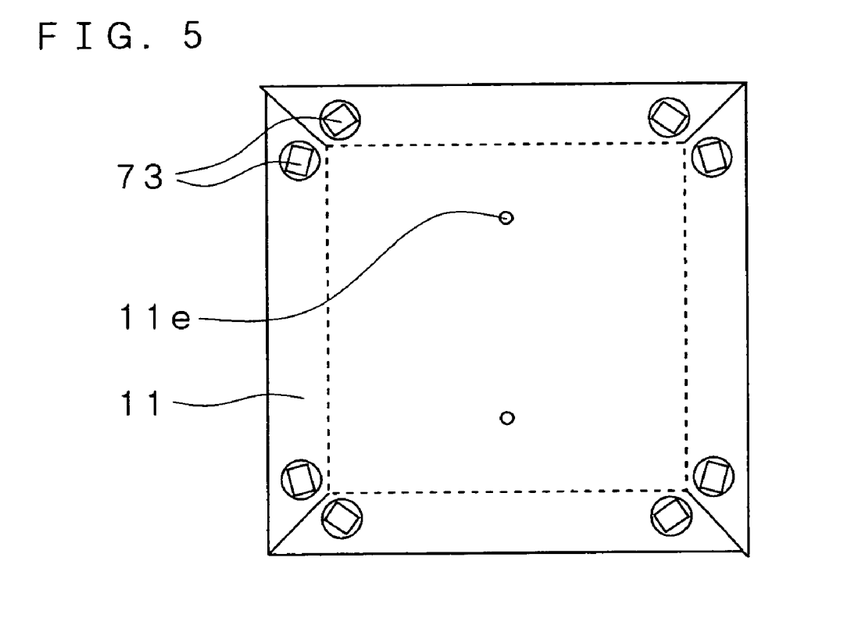
FIG. 5 is a figure showing still other example of the surface light source unit according to the present invention.

In FIG. 5, an example of using the LED 73 of a side view type described above is shown by a figure similar to FIG. 1A. In this case, by connecting directly a pair of leads of the LED 73 of a side view type by soldering or the like on a wiring board not shown in figure, the light is irradiated in a direction parallel to the wiring board, a light source unit can be formed only by covering the box body 11 thereon in same manner as that shown in FIG. 3.

In the structure shown in FIG. 1, in case of forming, for example, the surface light source of 80 mm square by using four of the LEDs 71 of 0.057 W input power, the brightness at a front surface even provided with a light diffusion member 13 is approximately 500 cd, and in case of forming the surface light source of 100 mm by using the same LEDs 71, the brightness is approximately 400 cd. Furthermore, in case of forming the light source of 100 mm square by using the LEDs 71 of 1 W input power, the brightness is high and approximately 2000 cd. A size of the box body 11 can be arranged depending on desired brightness or output power of LEDs. In addition, by operating the LEDs with a pulse driving or an alternating current driving, lifetime of the LEDs is elongated and electric power consumption is reduced because the brightness can not be influenced by irradiation by afterimages while the LEDs do not emit light.

In each of the examples described above, although one or two of the LEDs 7 are arranged on each of the four corners of the box body 11, each of the LEDs 7 described above may be arranged in the direction described above even on two corners opposite to each other along a diagonal line or two LEDs may be arranged on opposite two corners, in place of arranging on the four corners. Even in such arrangement, the whole space of the box body 11 is irradiated and the surface light source irradiating uniform light from an entire surface can be obtained.

Figure 6:
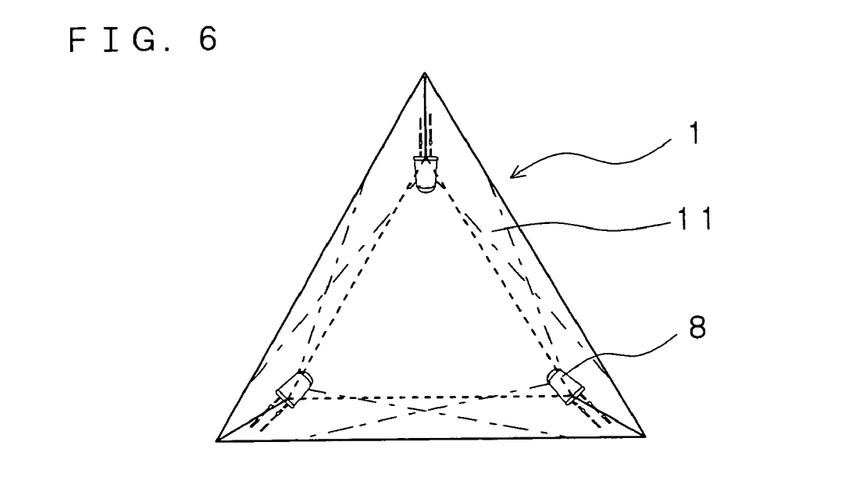
FIG. 6 is a figure explaining other example of the box body used for the surface light source unit according to the present invention.

Further, a plan shape (plan shape of a box body) of the surface light source unit may not be quadrilateral, and as an example of a triangle shape shown in FIG. 6, the surface light source unit can be formed by arranging polygons such as triangle, hexagonal or the like. In such polygons, by providing the LEDs 8 on its corners, the light can irradiate inside of the box body without making shadows and, at the same time, can be mixed with lights of the LEDs provided on the other corners. For example, in case of triangle, the LEDs 8 having directionality of approximately 70 to 90 degrees are arranged so as to face to a side wall opposite to the corner, and in case of hexagonal, the LEDs having directionality of approximately 120 to 150 are used or two LEDs, each of which has directionality of approximately 70 to 90 degrees, are provided on every corners. Here, in FIG. 6, numeral 1 represents a surface light source unit, numeral 11 a side wall and dotted lines regions irradiated by the LEDs 8.

Figure 7A:
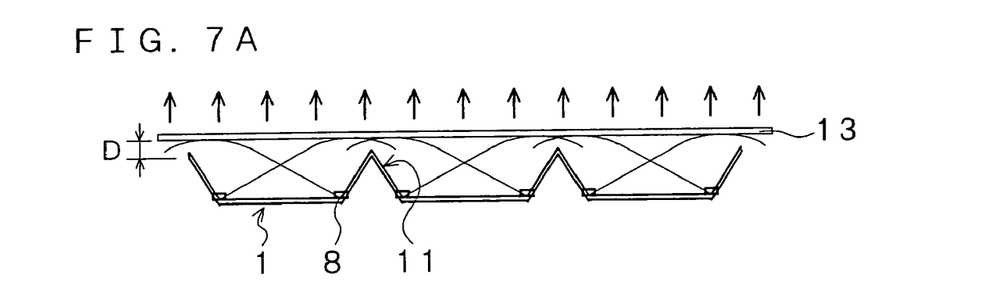
FIGS. 7A and 7B are figures explaining schematically irradiation regions of LEDs and a situation of diffused reflection of light by LEDs in the box body in case of using the box body shown in FIG. 1 and LEDs of a dome type.

In the box body 11 of the structure described above, when a surface light source of a large type is formed by arranging in a matrix structure by using LEDs of a dome type having directionality of, for example, 60 degrees, a region irradiated by the light, displayed on a figure of a side view, is spread over the side wall 11 as shown in FIG. 7A. Then, the light is mixed with the light from adjacent surface light source units 1. Since the light is mixed with the light from the adjacent surface light source units 1 even above the side wall 11 apart from the LEDs 8 where an amount of light is small, and since the light reflected at the highest part of the side wall 11, which is nearest the display surface side, namely the light diffusion member 13, has high brightness (brightness is in inverse proportion to a square of a distance from light source (diffused reflection part)), the brightness in the surface can be uniformed easily by adjusting a height and an inclined angle of the side wall 11. AS a result, although the brightness decreases at adjoining portions, when the surface light source of a large type is formed by arranging the surface light source units in directions of length and width, because the brightness decreases at a place where the side wall is exposed, almost same brightness as that at the center can be obtained at a position of 5 mm or more above from the upper surface of the box body 11 by being mixed with the light reflected from an inner surface or the light from the adjacent surface light source unit 1, and almost uniform brightness can be obtained, including the adjoining portions, at a position in a distance D of 5 to 30 mm from the upper surface of the box body.

Figure 7B:
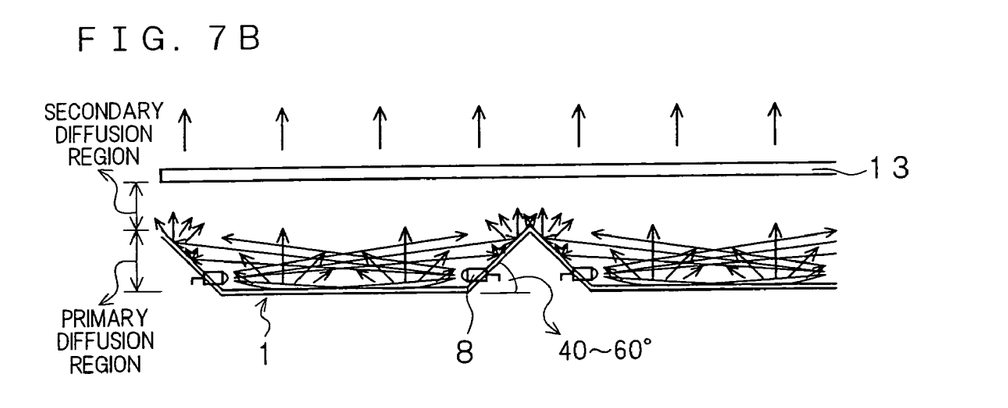

The distance from an upper surface of the box body, where the brightness becomes almost uniform, is a secondary diffusion region of diffusing the light above the box body 11 is preferably small from an aspect of a surface light source of a thin type. Although the distance D can be adjusted by the angle or the height of the side wall of the box body 11 described above, the directionality of the LEDs 8 or the like, if light is uniformed in a range from 5 to 30 mm, a surface light source of a very thin type can be obtained whose thickness is 50 mm or less in total, because the height of the box body 11 is from 10 to 20 mm as described above. On the other hand, the distance D can be adjusted also to 5 to 25 mm, further 5 to 20 mm, (a total thickness (C+D) including the height C of the box body (the primary diffusion region) is from 15 to 50 mm) by adjusting the side wall, or the like. FIG. 7B is a schematic figure showing a state (state of the primary diffusion region) of the light diffusedly reflected by the light diffused-reflection member inside of the box body 1. Namely, because irregularities are formed on a surface of the light reflection member, the light traveling toward the bottom surface travels in all directions by being reflected diffusedly, and is mixed more with lights of other LEDs 8. A display device for a liquid crystal display device or an electrically illuminated sign board can be fabricated by providing a liquid crystal panel or a display panel for signboards at a position of the distance D securing the secondary diffusion region, through a light diffusion member 13 (light diffusion plate) or a prism sheet (material for raising the brightness by condense light), or directly, and can display images with uniform brightness.

In the example described above, an explanation has been given such that the LED provided on the corner of the box body of quadrilateral takes charge of irradiating approximately a half space of the box body. But not limiting to a half space depending on the directionality of LEDs, one LED takes charge of whole inside of the box body of quadrilateral by providing a LED, for example, having directionality of approximately 120 degrees at each of corners irradiating light toward an opposite corner from the corner, and then by arranging LEDs on every corner, lights from all LEDs can be mixed thoroughly. In short, depending on the directionality of the LEDs, mass production of the box body for the LEDs having the directionality becomes capable by adjusting the height and the inclined angle or the like of the side wall of the box body (decide a height or the like of a side wall to uniform brightness in a surface in making prototype). Nevertheless, as described above, a structure in which LEDs irradiate a half space in a manner rotating subsequently is preferable.

Figure 8A:
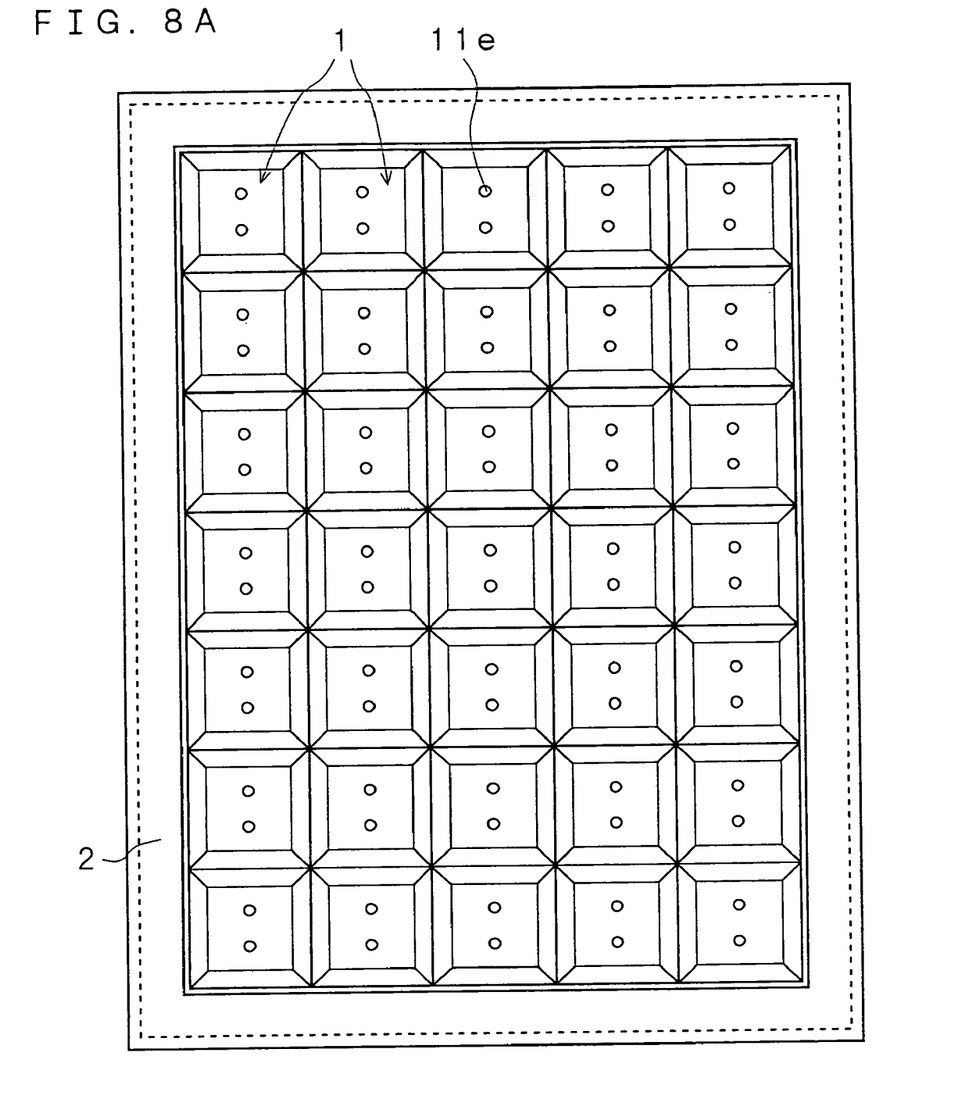
FIGS. 8A and 8B are figures explaining a plan view and a cross-sectional view of an example of an electrically illuminated signboard using the surface light source unit shown in FIG. 1.
Figure 8B:
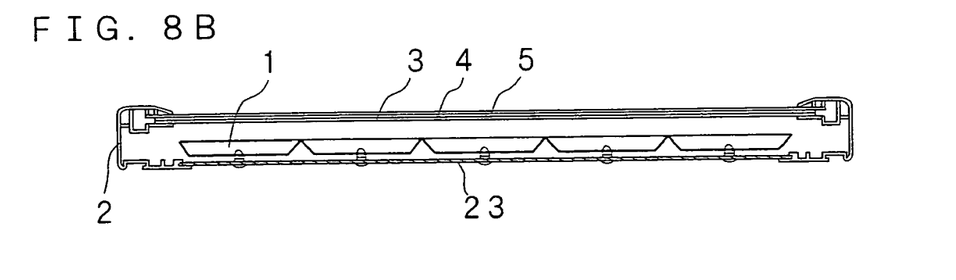

An explanation will be given below, taking an electrically illuminated signboard for example of a large surface light source formed by arranging a plurality of surface light sources. In FIG. 8, a plan view of a state removing a display panel and a light diffusion plate, and cross-sectional view of the electrically illuminated signboard are shown respectively.

Figure 9:
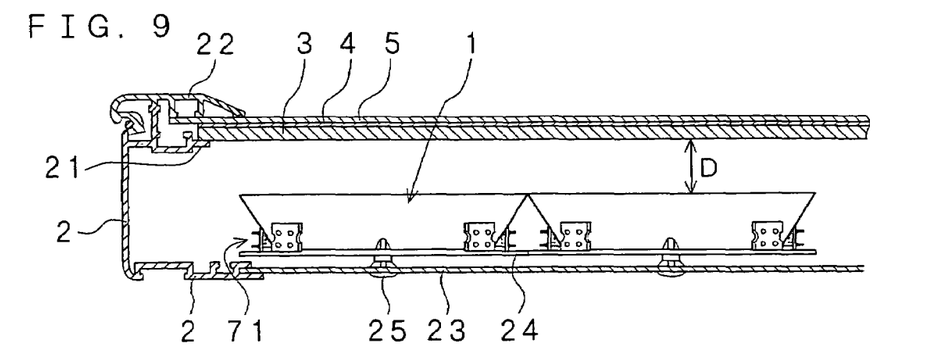
FIG. 9 is a figure explaining a partially enlarged figure of FIG. 6.

As shown in FIG. 8, a light source of an electrically illuminated signboard is formed as the surface light source formed by arranging surface light source units 1 shown in FIG. 1 in directions of length and width in a casing 2 formed with, for example, an aluminum frame or the like. As shown in FIG. 9 of a partially enlarged figure, the surface light source units 1 has a structure in which a wiring board 24 and the surface light source unit 1 are fixed together to through holes formed on a bottom plate 23 made of a composite plate, fixed to a bottom of the casing 2, with a resin rivet 25 provided with a detent. In this fixing step, the above-described rivet holes 11e shown in FIG. 1 or 4 are used. By this structure, by providing necessary resistors or wirings on the wiring board 24, the LEDs 71 can be connected easily to a power source only by fixing the surface light source unit 1 with the resin rivets 25 and by connecting leads of the LEDs 71.

By fixing with such resin rivets 25 or the like, if it becomes necessary to exchange LEDs because of faults occurring in the LEDs or the like, exchange of the surface light sources 1 can be easy as the surface light sources 1 can be easily removed while fixing the surface light sources not to move.

In case of making a large surface light source by arranging the surface light source units 1 side-by-side, the adjoining portion may be noticeable somewhat when a light diffusion plate is near the box body 11. As described above, the box body 11 is formed with a material formed by sticking a light reflection member 11b approximately 0.18 mm thick on a surface of an aluminum plate 11a approximately 0.35 thick, and by bending edge parts. Therefor, a thickness is approximately 0.53 in total and an edge surface thereof may be exposed to an upper surface as a result of bending. As the light reflection member 11b are exposed on an entire inner surface of the box body 11 except the through holes 11d to be inserted by the LEDs 12, reflected light by diffused reflection is observed as irradiation from the entire inner surface, but the light of diffused reflection can not be observed on the edge surface because the light from the LEDs can not reach the edge surface. The edge surface not irradiating light of diffused reflection may be observed as dark line when the width becomes over approximately 1 mm of two times by arranging two surface light source units 1.

Figure 10A:
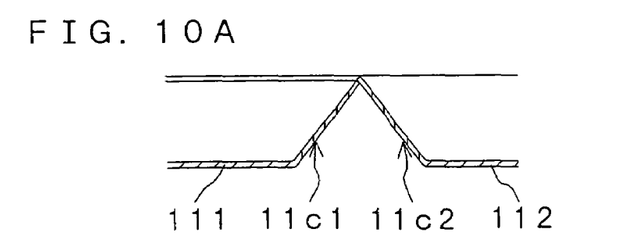
FIGS. 10A to 10C are figures explaining an example of eliminating lines of adjoining portions in case of arranging surface light source units.

As shown for example in FIG. 10A, since a thickness of an edge surface of a adjoining portion can be reduced to approximately 0.5 mm of a thickness of one side wall by forming a height of one side wall 11c1 of an adjacent box body 111 lower than a height of a side wall 11c2 of another box body 112 as a means to solve a problem described above, only one side wall 11c2 of a side wall not irradiating diffused light is exposed, and then, the adjoining portion can be almost unnoticeable. Then, as shown in FIG. 8A, in case of arranging the surface light source units 1 in directions of length and width, by forming heights of two of four side walls of a quadrilateral lower than those of other two side walls as shown in FIG. 1A, a large surface light source in which adjoining portions of the box bodies are not unnoticeable can be obtained by arranging so as to adjoin side walls of a high height and a low height, when the surface light source units 1 are arranged side-by-side.

Figure 10B:
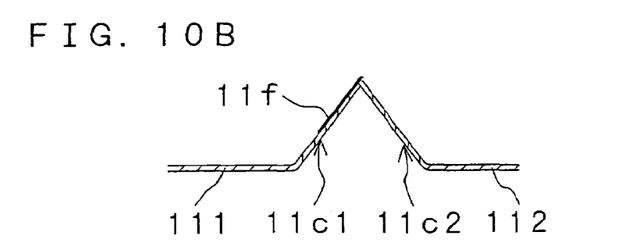
Figure 10C:
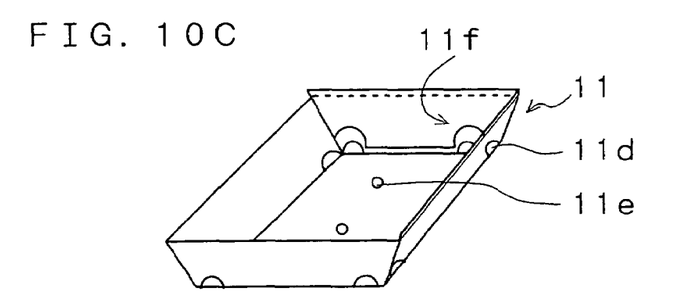

An example in which the adjoining portions are made more unnoticeable is shown in FIGS. 10B and 10C. Namely, as a figure of a similar explanatory cross-sectional view to FIG. 10A is shown in FIG. 10B, a light reflection sheet 11f such as the light reflection member 11b is stuck on an inner surface of the side wall 11c1 of a slightly lower height so as to cover the edge surface of the side wall 11c2 of the box body 112, the side wall 11c2 being provided so as to hang over the side wall 11c1 of the box body 111. As a result, the light reflection sheet 11f is approximately 0.18 mm thick, approximately same as the reflection member 11b, an edge part of the side wall 11c2 can be almost unnoticeable by viewing from a front side because of being hided by the light reflection sheet 11f. As described above, as the light reflection sheet 11f is only stuck on two side walls of the box body 11, as a figure of an explanatory oblique view of one box body 11 in FIG. 10C, the light reflection sheets 11f are stuck on two side walls so as to be slightly higher than other side walls. In addition, when the light reflection sheet 11f is stuck on an inner surface of the side wall 11c2 of a higher height, an edge surface of the side wall 11c2 can be made also unnoticeable by viewing from a front side.

An electrically illuminated signboard by using the surface light source is fabricated, in a same constitution as usual such that after assembling a light diffusion plate 3, a display panel 4 on which images are painted and a transparent cover 5 to a fixing part 21 of an aluminum casing 2 through a distance D of 5 to 30 mm from the upper surface of the surface light source unit, the assembled parts are fixed to the aluminum casing 2 with a fixing member 22 provide rotationally freely to the aluminum casing 2. By this structure, it becomes easy to exchange the display panel 4 and to repair the surface light source 1.

The light diffusion plate 3 is a plate of a thickness of approximately 3 mm made of milky white acrylic resin (PMMA) usually called "semi-transparent milky-white", polyethylene terephthalate (PET), polycarbonate, glass or the like and has a function of irradiating light from even an oblique direction uniformly to all direction on its surface. Although the light diffusion plate 3 is preferably thick for making light from an oblique direction of an under surface not having directionality, a light diffusion sheet such as thin vinyl sheet (FF sheet) or milky white sheet can be used as a light diffusion plate when variance of the light irradiated from the light diffusion member 13 of the under surface is hardly observed. Further, the brightness can be raised by several times, by providing a prism condensing light in place of the light diffusion plate 3 or on the light diffusion plate 3.

The display panel 4 is a transparent sheet on which images to be displayed such as letters, figures or the like are printed in color, and it is irradiated from back side by lighting to display brightly. A transparent cover 5 in a film form or of a thickness of several millimeters made of acrylic plate or glass plate is superposed in order to protect the display panel 4 at a top surface side of the display panel 4.

By this structure, for fabricating an electrically illuminated signboard of an A2 size of 57 cm (length)×41 cm (width), in case of arranging one LED on each corner described above, when the surface light source unit 1 of 10 cm square is used, surface light sources of 6 units×4 units=24 units (electric power consumption of 5.5 W in total LED) are used and when a surface light source unit 1 of 8 cm square is used, a surface light source of 7 units×5 units=35 units (electric power consumption of 8 W in total LED) are used, and electrically illuminated signboards are obtained whose brightness at each display surface are approximately 400 cd and approximately 500 cd. In a case of arranging two LEDs on each corner of the surface light source unit 1 for high brightness use, when an electrically illuminated signboard of a A2 size is fabricated, brightness of approximately 700 cd at electric power consumption of 11 W is obtained by using the surface light source unit of 10 cm square, and brightness of approximately 900 cd at electric power consumption of 16 W is obtained by using the surface light source unit 1 of 8 cm square (extra high brightness) and variance of the brightness on the entire surface is within 10% respectively. In a conventional electrically illuminated signboard using fluorescent lamps, two fluorescent lamps of 20 W are needed to get a signboard of an A2 size and of brightness of approximately 800 cd, then same brightness can be obtained with electric power consumption of approximately a quarter or less comparing to the conventional electric power consumption.

This comes from that the light is used effectively without being wasted because a distance between a light source and a display panel can be very small by using LEDs having directionality and by irradiating strong light obtained by diffused reflection from a shallow box body by diffusing uniformly by using reflection in the box body. In addition, as the distance between the light source and the display panel can be very small, a signboard can be constituted with a total thickness (distance from a bottom surface of the casing 2 to the top face) of approximately 45 mm.

INDUSTRIAL APPLICABILITY

The surface light source according to the present invention can be used for backlights of liquid crystal television receivers of a large type or electrically illuminated signboards in stations, public square, exhibition hall or the like.

Although preferred examples have been described in some detail it is to be understood that certain changes can be made by those skilled in the art without departing from the spirit and scope of the invention as defined by the appended claims.

What is claimed is:

1. A surface light source unit comprising:
a box body of a tray shape, whose bottom surface is quadrilateral, whose upper side is open, on a bottom surface and side walls of which a light diffused-reflection member is provided, the side walls being inclined outward, and
semiconductor light emitting devices provided on at least two corners of edge parts of the bottom surface of the box body so as to irradiate light toward center parts of the side walls opposite to the corners,
wherein the semiconductor light emitting devices have a directionality of 45 to 60 degrees, and the light irradiated from each semiconductor light emitting device is mixed mutually in the box body by being reflected diffusedly on the bottom surface and the side walls of the box body, and is averaged in brightness, chromaticity and luminescent hue, and
wherein an inclined angle and a height of the side walls of the box body are set so as to make brightness on the opened upper surface above the side walls of the box body and above a center part of the box body substantially equal.

2. The surface light source unit according to claim 1, wherein each of the semiconductor light emitting devices is a chip type light emitting device and has at least one of structures in which:
a light emitting semiconductor chip is mounted on a flat surface of one of a pair of leads and coated with light transmitting resin so as to have a lens portion at a front side;
a light emitting semiconductor chip is mounted on a flat surface of one of a pair of leads and coated with light transmitting resin so as to have a flat surface at a front side;
a structure of a side-view type is formed in which, by exposing an end part of each of a pair of leads in a recess, by fixing the other end part with resin so as to be located on an outer wall, and by mounting a light emitting chip in the recess, light is irradiated in a direction perpendicular to a surface on which end parts of the pair of the leads are connected;
a light emitting chip is mounted on an insulating substrate, and a pair of terminal electrodes or leads are arranged on opposite end portions of the insulating substrate, and surrounding of the light emitting chip is coated with light transmitting resin; and a structure of a reflection type is formed in which a reflection wall is formed around a light transmitting resin which coats a light emitting chip provided on an insulating substrate.

3. The surface light source unit according to claim 1, wherein two light emitting devices are arranged on each corner of at least the two corners, and wherein a set of the two light emitting devices are arranged so that each region mainly irradiated by the two light emitting devices is a different half space as to a diagonal line passing the corner where the two light emitting devices are provided.

4. An electrically illuminated signboard comprising:
a surface light source formed with a plurality of the surface light source units according to claim 1,
a light diffusion plate provided through a certain distance over the surface light source and
a display panel provided on the light diffusion plate.

5. A surface light source comprising:
a plurality of the surface light source units according to claim 1 provided side-by-side without gaps,
wherein each of the surface light source units is formed so that brightness above center portion part of each of the surface light source units and brightness above adjoining portion of the surface light source units are substantially equal in a surface at least 25 mm above from an upper surface of the surface light source units arranged.

6. The surface light source according to claim 5, wherein at least one of a light diffusion member, a condenser prism and a display panel is provided at a position 5 to 30 mm high from the upper surface of the surface light source unit.

7. The surface light source according to claim 5, wherein leads to be connected to electrodes of each of the light emitting devices are drawn out in a space portion formed outside of the box body at a bottom between adjacent box bodies, to be connected to a power source.

8. The surface light source according to claim 5, wherein the surface light source units are arranged so as to prevent adjacent two side walls of adjacent surface light source units from being exposed in the same height at a surface, by forming a side wall of one surface light source unit lower than the other at a portion of adjoining each other.

* * * * *